United States Patent
Kalu et al.

(10) Patent No.: US 9,652,142 B2
(45) Date of Patent: *May 16, 2017

(54) SYSTEM AND METHOD OF MODE-SWITCHING FOR A COMPUTING DEVICE (71) Applicant: BLACKBERRY LIMITED, Waterloo (CA)

(72) Inventors: Kalu Onuka Kalu, Waterloo (CA); Laura Mahan, Kanata (CA); Jung-Chien Kevin Chuang, Port Coquitlam (CA)

(73) Assignee: BlackBerry Limited, Waterloo, Ontario (CA)

( * ) Notice: Subject to any disclaimer, the term of this patent is extended or adjusted under 35 U.S.C. 154(b) by 318 days.

This patent is subject to a terminal disclaimer.

(21) Appl. No.: 14/467,831

(22) Filed: Aug. 25, 2014

(65) Prior Publication Data

US 2014/0365902 A1 Dec. 11, 2014

Related U.S. Application Data (63) Continuation of application No. 13/276,122, filed on Oct. 18, 2011, now Pat. No. 8,816,958.

(51) Int. Cl.
G09G 5/00 (2006.01)
G06F 3/0488 (2013.01)
(Continued)

(52) U.S. Cl.
CPC .......... G06F 3/0488 (2013.01); G06F 1/1694 (2013.01); G06F 1/1698 (2013.01);
(Continued)

(58) Field of Classification Search
CPC combination set(s) only.
See application file for complete search history.

(56) References Cited

U.S. PATENT DOCUMENTS 5,681,220 A 10/1997 Bertram
7,629,963 B1 12/2009 Wright
(Continued)

FOREIGN PATENT DOCUMENTS

EP 2309366 4/2011
WO 2007004990 A1 1/2007
(Continued)

OTHER PUBLICATIONS

Extended European Search report mailed Mar. 1, 2012; in corresponding application No. 11185690.2.
(Continued)

Primary Examiner — Van Chow
(74) Attorney, Agent, or Firm — Fish & Richardson P.C.

(57) ABSTRACT

A first device such as a portable computing device can be configured to act as a text-entry device (in a text-entry mode) and a cursor control device (in a cursor control mode) for a second device. The first device can include a touch-sensitive display capable of receiving text inputs and cursor inputs for controlling the display of a second device which is communicatively coupled to the first device. The first device can be configured such that selection of certain items displayed by the second device can cause the first device to switch from a text-entry mode to a cursor control mode. The first device can be configured such that rotation of the device between a landscape orientation and a portrait orientation causes the device to switch between modes. The first device can be configured such that sideways movement of the device causes the device to switch between modes.

20 Claims, 9 Drawing Sheets (51) Int. Cl.
    *G06F 3/0346*    (2013.01)
    *G06F 1/16*    (2006.01)
    *G06F 3/038*    (2013.01)
    *G06F 3/0482*    (2013.01)

(52) U.S. Cl.
    CPC ............ *G06F 3/038* (2013.01); *G06F 3/0346* (2013.01); *G06F 3/0482* (2013.01); *G06F 3/04886* (2013.01); *G06F 2200/1614* (2013.01); *G06F 2203/0384* (2013.01)

(56) References Cited

U.S. PATENT DOCUMENTS

| | | |
|---|---|---|
| 7,796,118 B2 | 9/2010 | Groom |
| 2004/0145606 A1 | 7/2004 | Jones |
| 2005/0007343 A1 | 1/2005 | Butzer |
| 2006/0019706 A1 | 1/2006 | Ho |
| 2006/0079276 A1 | 4/2006 | Indik |
| 2007/0042807 A1 | 2/2007 | Khoo |
| 2007/0105591 A1 | 5/2007 | Chan |
| 2008/0274695 A1 | 11/2008 | Muth |
| 2008/0316177 A1 | 12/2008 | Tseng |
| 2009/0066541 A1 | 3/2009 | Ma |
| 2009/0179869 A1 | 7/2009 | Slotznick |
| 2009/0186652 A1 | 7/2009 | Combs |
| 2009/0213081 A1 | 8/2009 | Case |
| 2010/0088632 A1 | 4/2010 | Knowles et al. |
| 2010/0323762 A1 | 12/2010 | Sindhu |

FOREIGN PATENT DOCUMENTS

| | | |
|---|---|---|
| WO | 2009/096644 | 8/2009 |
| WO | 2010016717 A2 | 7/2010 |

OTHER PUBLICATIONS

The International Search Report and the Written Opinion mailed Nov. 30, 2011; in corresponding application No. PCT/CA2011/050657.

Examination Report mailed Jun. 11, 2013, in corresponding European patent application No. 11185690.2.

Mobile Remote—Innovative solutions for mobile devices. http://www.mobilesrc.com/default.aspx?id=3; published on 2010 and retrieved Sep. 5, 2011.

Gremote—The best way to control PC using PDA. www.gbmsoftware.com; retrieved Sep. 5, 2011.

Remote Droid—Use your Android phone as a wireless keyboard and mouse to remote control your computer. http://remotedroid.net; published in 2009 and retrieved on Sep. 11, 2011.

Hippo Remote—Wireless Keyboard, Mouse , Remote Controller for iPhone and iPod touch. http://hipporemote.com; published on 2009-2011 and retrieved on Sep. 5, 2011.

Office Action mailed Oct. 2, 2014; in Canadian patent application No. 2,813,263.

Summons to Attend Oral Proceedings issued in European Application No. 11185690.2 on Feb. 10, 2017.

SYSTEM AND METHOD OF MODE-SWITCHING FOR A COMPUTING DEVICE

CROSS-REFERENCE TO RELATED APPLICATION

This application is a continuation of U.S. application Ser. No. 13/276,122, filed Oct. 18, 2011, the contents of which are entirely incorporated by reference herein.

FIELD OF TECHNOLOGY

The present disclosure relates generally to the use of a first electronic device to control a display of a second electronic device.

BACKGROUND

Tablet computers are tablet-sized computers that can have many features of a larger full-size personal computer. Tablet computers can be communicatively coupled to an electronic device such as a handheld device like a smart phone. An electronic device can be configured to receive input signals which are used to control the actions of a tablet computer.

BRIEF DESCRIPTION OF THE DRAWINGS

In order to describe the manner in which the features of the disclosure can be obtained, a more particular description of the principles to be described will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the scope of the disclosure.

Several definitions that apply throughout this document will now be presented. The phrase "coupled" is defined as connected, whether directly or indirectly through intervening components and is not necessarily limited to physical connections. Coupled devices are devices which are in signal communication with one another.

The term "computing device" is defined as any device that is capable of at least accepting data, communicating data, and executing commands. For example, computing devices can include, but are not limited to, portable communication devices, mobile communication devices, mobile computers, smartphones, computing pads, tablet computers, personal computers, desktop computers, laptop computers, netbooks, servers, routers, set-top phones, or other computing device capable of at least accepting data, communicating data, and executing commands.

The term "text-entry mode" is defined as a device being enabled to receive, send, or process text-related commands such as to select or display text. The term "cursor control mode" is defined as a device being enabled to receive, send, or process cursor controlling inputs or commands such as by a joy stick, optical navigation module, touch pad, touch-sensitive display, or the like. The term "text-entry field" is defined as an area displayed on the display of a device, the selection of which can be interpreted as indicative of a desire to input text to a device.

The term "character" is defined as a symbol, such as a number, letter or other shape and the like. The term "touch" means the contact of a finger, finger-tip, digit, or stylus and the like. A touch can include a sweep or other gesture. The term "item" is defined as an icon, symbol, or picture and the like.

The term "movement input" is defined as a movement or motion of a device which can be translated into a signal. The term "accelerometer" is defined as a device that senses or measures acceleration. Acceleration can be translational or can occur about an axis of rotation or both. Accelerometers can include one or more gyroscopes.

Figure 1:
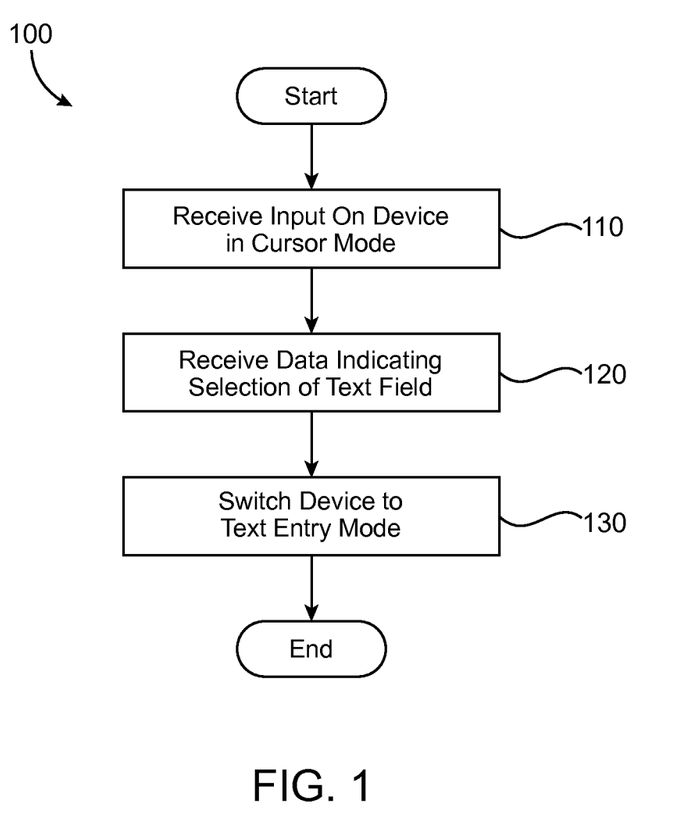
FIG. 1 is a flow chart of a method of switching a device from a cursor mode to a text-entry mode in accordance with an exemplary embodiment.

FIG. 1 is a flow chart of a method of switching a device from a cursor mode to a text-entry mode in accordance with an exemplary embodiment. The method 100 illustrated in FIG. 1 is provided by way of example, as there are a variety of ways to carry out the method. Additionally, while the exemplary method 100 is illustrated with a particular order of steps, those of ordinary skill in the art will appreciate that FIG. 1 and the steps illustrated therein can be executed in any order that accomplishes the technical advantages of the present disclosure and can include fewer or more steps than illustrated. Furthermore, the exemplary method 100 can be combined with the methods shown in FIGS. 2 and 3, as will be explained below.

Each block shown in FIG. 1 represents one or more processes, methods or subroutines, carried out in exemplary method 100. The steps illustrated in FIG. 1 can be implemented in a system including a first computing device coupled to a second computing device. For example, each block shown in FIG. 1 can be carried out by the processor of the computing device 430 illustrated in FIG. 2. The flow chart illustrated in FIG. 1 will be described in relation to and make reference to the first computing device 430 and the second computing device 400 illustrated in FIG. 4. In the example discussed in the next paragraph, inputs on the first device can be used to at least partially control the second device.

In FIG. 1, the method 100 can begin at block 110. When the method 100 starts a first device is in a cursor mode, which is a mode in which inputs on the first device can be used to control the position of the cursor on a second device. At block 110, an input is received by a first device. The input can be, for example, a touch contact on a touch-sensitive display of the first device. The input can be transmitted away from the first device to control the display of the second device. For example movements along a touch-sensitive display on the first device can cause a cursor displayed on the display of the second device to change position. Thus, for example, a change in the position of a finger on the touch-sensitive display can cause a corresponding change in position of a cursor on the display of the second device. Inputs on the first device in the cursor mode can be used to make selections of selectable items displayed on the display of the second device. For example, at block 110 an input can be received which selects an item displayed on the display of the second device. The input can be, for example, the selection of a text-entry field displayed on the display of the second device. Although the discussion of the method 100 illustrated in FIG. 1 uses the example of selection of a text-entry field as an indication of a desire to enter text, other inputs and selections are possible within this disclosure, as will be explained below. Once the input received at block 110 has been transmitted away from the first device for selecting a text-entry field on the second device, the second device can send a signal to the first device indicating that the text-entry field has been selected, and the method can proceed to block 120.

At block 120, the first device receives data which can be carried by a signal from the second device indicating that a selection of a text-entry field has occurred. Once data indicating selection of a text-entry field (or otherwise indicating a desire to use the second device to enter text) has been received by the second device, the method can proceed to block 130.

At block 130 the first device can switch from a cursor mode to a text-entry mode. The first device can be configured to display selectable characters on a touch-sensitive display when the first device is in the text-entry mode. Displaying selectable characters can consist of, for example, displaying a virtual keyboard or virtual keypad or both. Thus, at block 130, the first device switches from a mode in which it acts as a cursor control mechanism for the second device, to a mode in which is acts as a text-entry mechanism for the second device, as will be explained with reference to FIG. 2. (When the first device is in the text-entry mode, the first device can be switched to a cursor control mode, as will be explained with reference to FIG. 3.)

Figure 2:
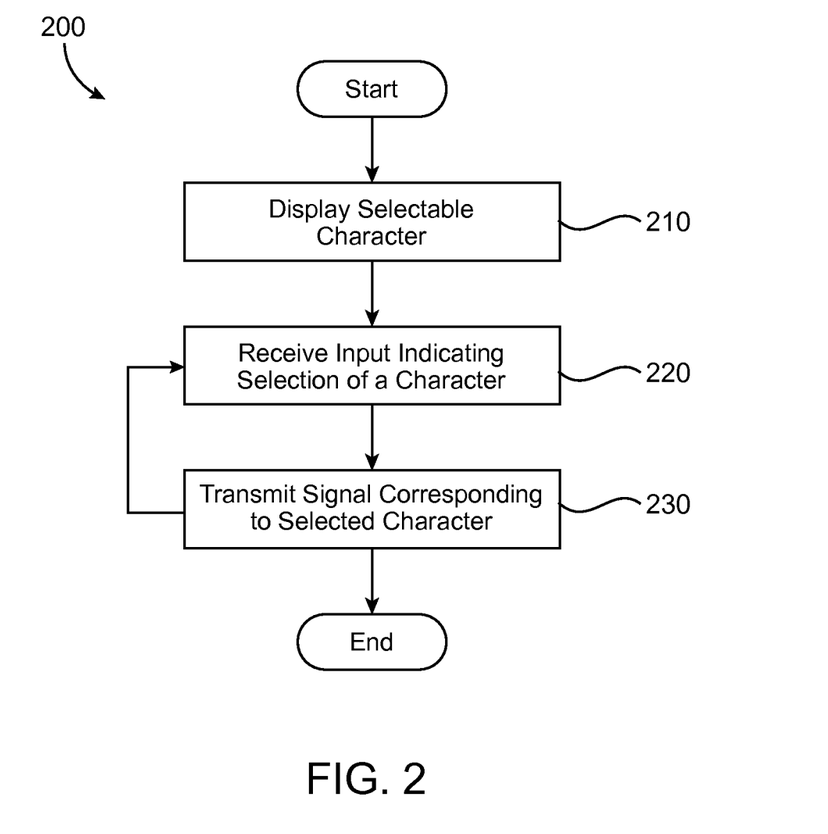
FIG. 2 is a flow chart of a method of entering text on a first device for display on a second device in accordance with an exemplary embodiment.

FIG. 2 is a flow chart of a method 200 entering of text on a first device for display on a second device in accordance with an exemplary embodiment. Continuing with the example discussed in regard to FIG. 1, the method 200 pertains to a first device which is in a text-entry mode. The first device can be in a text-entry mode because it was switched to a text-entry as in block 130. At block 210, the first device can display selectable characters on a touch-sensitive display. Once one or more selectable characters are displayed on the display of the second device, the method can proceed to block 220.

At block 220, the first device can receive input indicating selection of a displayed character. The input indicating selection of displayed character can consist of a touch or tap or other input used to convey a selection on the first device. Once a selection of a character has occurred, the method can proceed to block 230.

At block 230, the first device sends a signal to a corresponding to a selected character. The signal can be received by a second device. After the second device receives the signal corresponding to selection of a character on the first device, the second device can, as a result, cause the selected character to be displayed on the display screen of the second device. It will be understood that by performing the functions at block 220 and 230 multiple times, method 200 enables the second device to act as a text-entry mechanism for the second device. It will further be understood that the second device is considered to be in a text-entry mode throughout performance of method 200. When the first device is in the text-entry mode, the first device can be switched to a cursor control mode, as will be explained with reference to FIG. 3.

Figure 3:
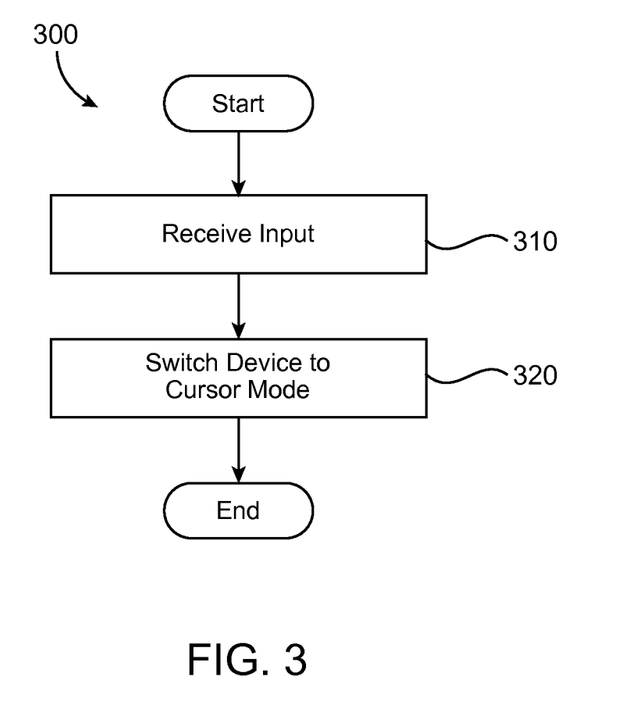
FIG. 3 is a flow chart of a method of switching a device from a text-entry mode to a cursor mode.

FIG. 3 is a flow chart of a method 300 of switching a first device from a text-entry mode for entering text to a second device to a cursor control mode for controlling a cursor on a second device. As explained above, when the first device is in a text-entry mode it can display selectable characters in a virtual keyboard. At block 310, when the first device is in a text-entry mode, the first device can receive at least one input indicating a desire to use the first device as a cursor control mechanism for a second device. The input can consist of a certain type of touch, for example a sweep from one portion of a touch sensitive display to another portion of the touch sensitive display, or a sequence of taps. It will be understood that other types of touches are possible within this disclosure. As will be further explained, the input can also consist of a touch on a particular portion of the touch sensitive display or can be an actuation of an actuable input device, such as, for example, the depression of an escape button or a return button, or a navigation tool such as an optical navigation unit, or any combination thereof.

The input can also consist of a movement input. A movement input can include rotating the first device from a substantially portrait orientation to a substantially landscape orientation. A movement input can further include rotating the first device from a substantially landscape orientation to a substantially portrait orientation. A movement input can further include translational movement, such as moving the device up and down, or from side-to-side. A movement input can also include tilting a device from a generally flat orientation to a generally angled orientation and tilting a device from an angled orientation to a flat orientation. It will be understood that other types of inputs indicating a desire or intent to use the first device as a cursor control mechanism for a second device are possible within this disclosure. When such an input is received by the first device the method proceeds to block 320.

At block 320 the first device switches from a text-entry mode to a cursor control mode. As explained above, when the first device is in a cursor control mode, inputs on the first device are used to control the actions of a cursor displayed on a second device. As explained with reference to FIG. 1, when the first device is in the cursor control mode the first device can be switched back to the text-entry mode using method 100.

Figure 4:
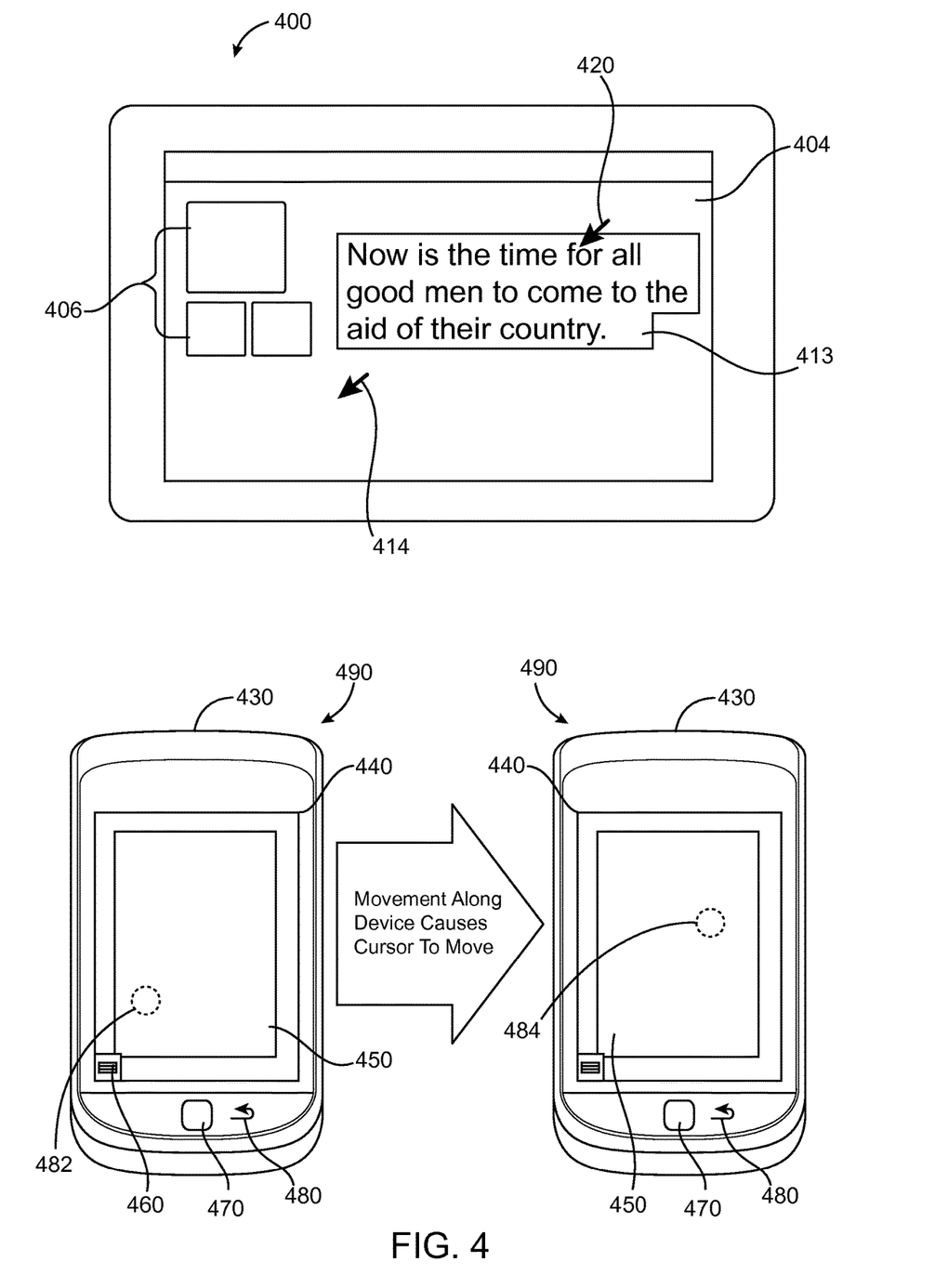
FIG. 4 illustrates moving a cursor on a second device in response to an input received on a first device in accordance with an exemplary embodiment.

FIG. 4 illustrates a first device 430 coupled to a second device 400. The first device 430 is in a cursor control mode 490 in which inputs on the first device 430 control the display 404 of the second device 400. Controlling the display 404 of the second device 400 can include controlling a cursor (e.g. 414) on the display 404. One way a cursor (e.g.

414) can be caused to move is by moving a finger, finger-tip or stylus from one position (e.g. 482) along a touch-sensitive display 440 of the first device 430 to a second position 484. In the example illustrated in FIG. 4, movement from position 482 to position 484 on the display 440 of the first device 430 causes the cursor on the display 404 of the second device 400 to move from position 414 to position 420. The touch-sensitive display 440 of the first device 430 can contain a smaller area 450 which acts like a virtual mousepad for receiving inputs for directing cursor actions.

The cursor on the display 404 can be moved to any area of the display 404. The cursor can be moved to selectable items 406 on the display 404 or to a text-entry field 413 on the display 404. Selectable items 406 can include a text-entry icon. If such a selectable item 406 is selected by actions on the first device 430 this can cause the first device to switch to a text-entry mode. Another way that a first device 430 can be caused to switch to a text-entry mode is by actuating the virtual mouse pad 450 of the first device 430 in a particular manner when the cursor (e.g. 420) is in contact with a text-entry field 413. Actuating the virtual mouse pad 450 can include a tap, or double tap or other suitable action on the touch-sensitive display 440 of the first device.

As illustrated in FIG. 4, a touch sensitive display 440 of a first device 430 can display a selectable item 460. The first device 430 can be configured to switch to a text-entry mode if the selectable item 460 is selected by a suitable input such as a touch on the area of the touch-sensitive display 440 depicting item 460. The first device 430 can also include one or more actuable devices such as a navigation tool 470 and a return or escape button 480. The first device can be configured to toggle between a cursor control mode 490 and a text-entry mode in response to actuation of actuable devices such as 470 and 480. Additionally, the first device 430 can include a physical keyboard or keypad (not shown) and the first device 430 can be configured to switch to a text-entry mode 490 when one or more of the keys are actuated.

Figure 5:
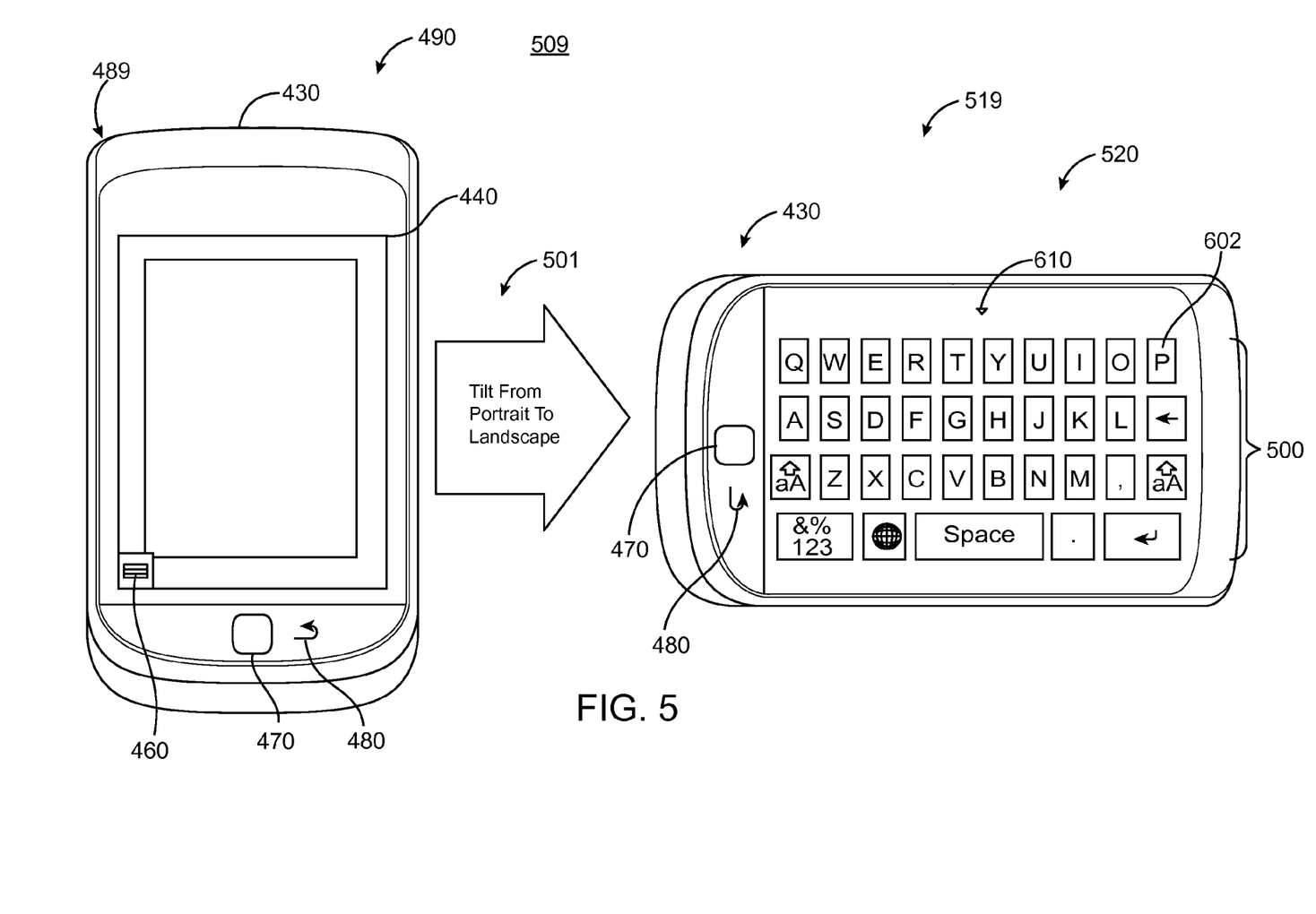
FIG. 5 illustrates switching a device to a text-entry mode in response to rotating the device from a portrait orientation to a landscape orientation in accordance with an exemplary embodiment.

FIG. 5 illustrates a first device 430 switching to a text-entry mode 520 as a result of receiving a movement input consisting of changing the orientation of the device 430. A first device 430 can be configured to switch from a cursor control mode 490 to a text-entry mode 520 when the device 430 is rotated from a substantially portrait orientation 489 to a substantially landscape orientation 489. The device 430 can include an accelerometer or other suitable device coupled to a processor, and capable of sensing such movements of the device 430.

As illustrated in FIG. 5, a device 430 can exist in a cursor control mode 490 when the device 430 is in a portrait orientation 489. When the device 430 is turned approximately ninety degrees towards a landscape orientation 519, the device 430 switches from a cursor mode 490 to a text-entry mode 520 in which a keyboard 500 containing selectable keys 602 are displayed. As explained above, the selectable keys 602 can be selected to enter text which can be displayed and processed by a second device 400.

Figure 6:
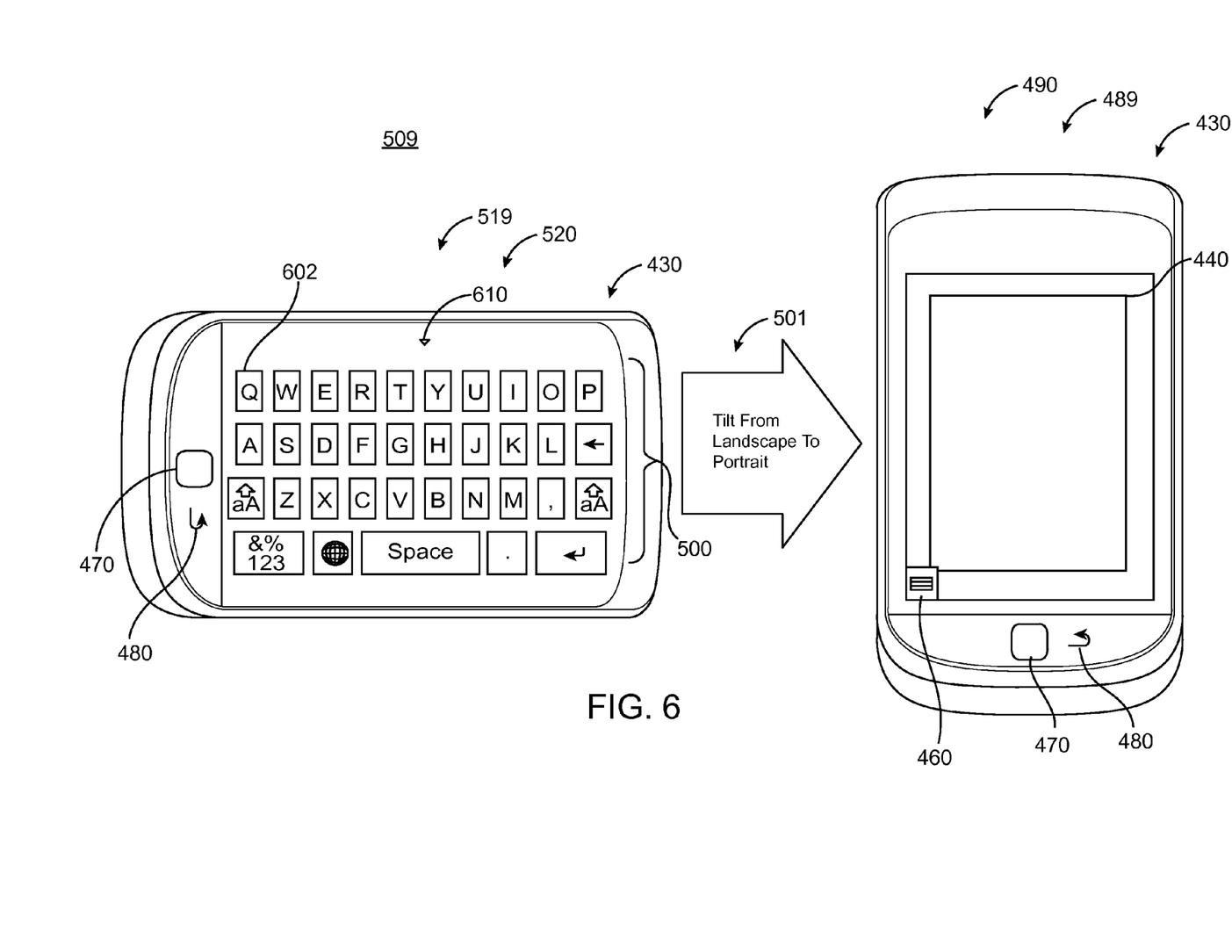
FIG. 6 illustrates switching a device from to a cursor mode in response to rotating the device from a landscape orientation to portrait orientation in accordance with an exemplary embodiment.

FIG. 6 illustrates a first device 430 switching from a text-entry mode 520 to a cursor control mode 490 in response to a movement input, the movement input consisting of rotating the device 430 approximately ninety degrees from a substantially landscape orientation 519 to a substantially portrait orientation 489. Thus, as illustrated in FIG. 5 and FIG. 6, a first device 430 can be configured generally to switch from one input mode to another input mode depending on the relative rotation of the device 430. Furthermore, a device 430 can be configured to switch from one mode to another mode in response to a tilting of the device 430. For example, a device 430 can be configured to change from a cursor control mode 490 to a text-entry mode 520 when the device 430 is moved from a substantially flat orientation to a substantially angled position.

It will be understood that other various types of actions on the first device 430 can cause the first device 430 to switch between a cursor control mode and a text-entry mode 520. For example, if the cursor 420 on the second device 400 is in contact with the text-entry field on the display 404 of the second device 400, an input such as, for example, a prolonged touch or double tap on the touch-sensitive display 440 of the first device 430 this can cause the first device 430 to enter a text-entry mode 520. Furthermore, as discussed above with reference to FIG. 4, first device 430 can be configured to switch to a text-entry mode 520 if a selectable item 460 is selected by a suitable input such as a touch on the area of the touch-sensitive display 440 depicting item 460. The first device 430 can also include one or more actuable devices such as a navigation tool 470 and a return or escape button 480 which, when activated or actuated when the first device is in the a cursor control mode 490, can cause the first device 430 to switch to a text-entry mode 520.

When the first device 430 is in a text-entry mode 520, the first device 430 can display selectable characters (e.g 602). Displaying selectable characters can include displaying a virtual keyboard 500 or a virtual keypad (not shown). As discussed above, when the first device 430 is in a text-entry mode 520 selection of characters (e.g. 602) on the first device 430 can cause the display 440 of a second device 400 to display the selected characters. Thus when the first device 430 is in a text-entry mode 520 it can act as a keyboard or keypad for the second device 400, as discussed in reference to FIG. 2. The device 430 can be configured to display at least one selectable icon 610 which can be actuated to switch the device 430 back to a cursor control mode 490. Thus a device 430 in a landscape orientation 519 can be switched to a cursor mode 490 by selection of a selectable icon 610 while remaining in a landscape orientation 519 (not shown).

Figure 7:
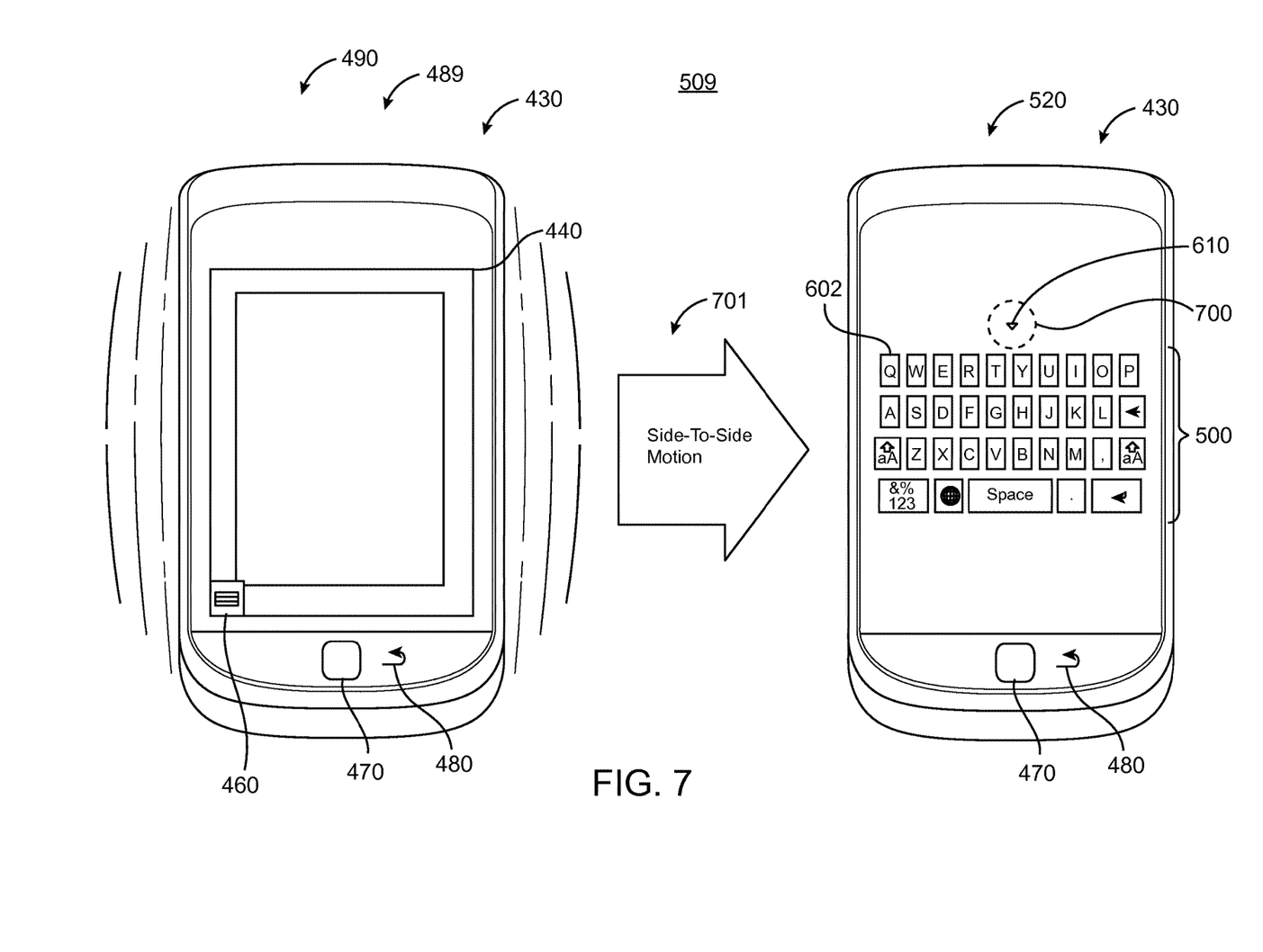
FIG. 7 illustrates switching a device from a cursor mode to a text-entry mode in response to a movement input in accordance with an exemplary embodiment.

The first device 430 can be configured to switch from one input mode to another in response to translational movement. FIG. 7 illustrates a first device 430 switching from a cursor control mode 490 to a text-entry mode 520 as a result of translational movement (such as a sideways movement, as is illustrated) accordance with an exemplary embodiment. When the device 430 is moved from side-to-side as illustrated, this causes the device 430 to switch from a cursor control mode 490 to a text-entry mode 520.

Figure 8:
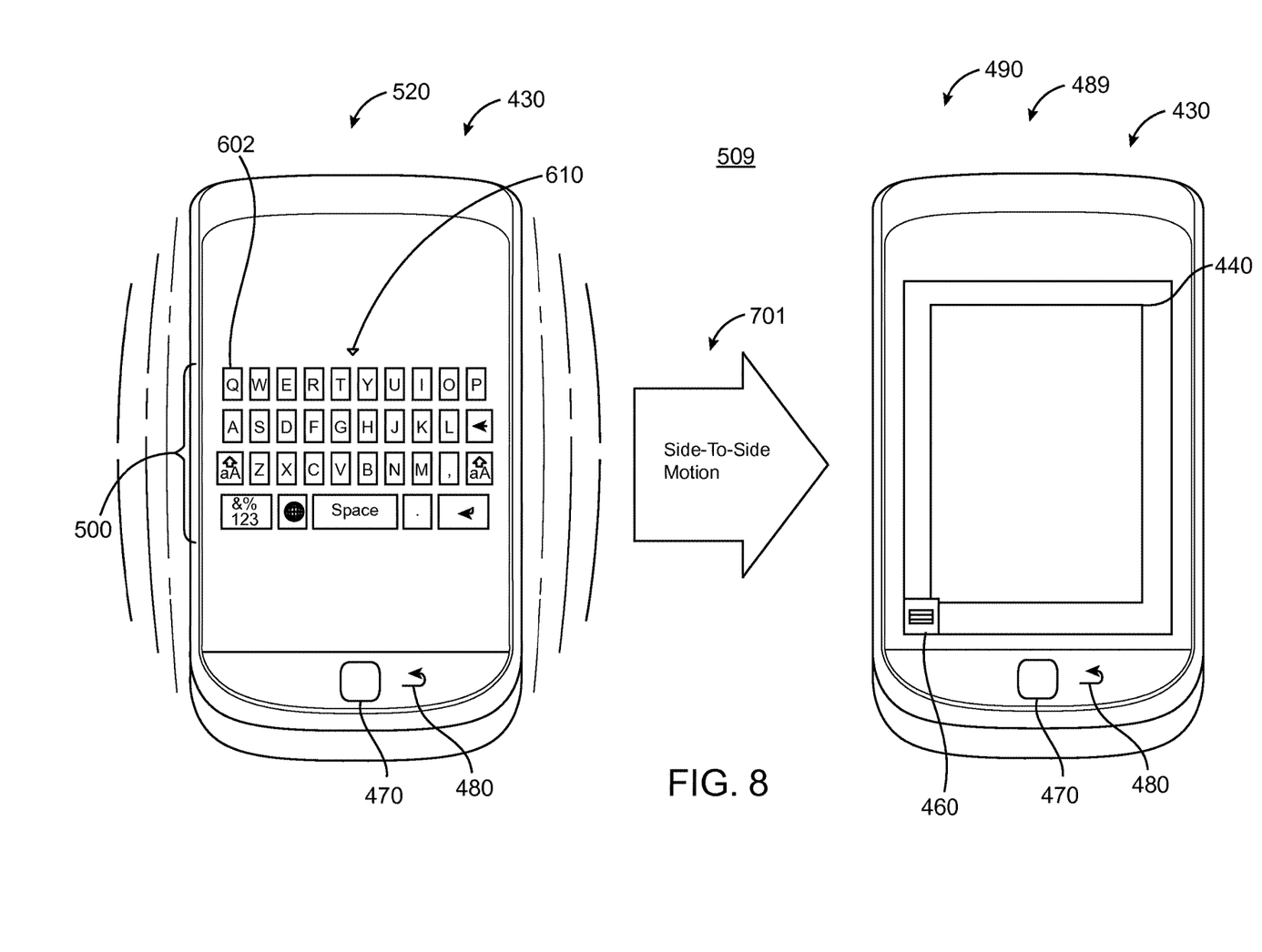
FIG. 8 illustrates switching a device from a text-entry mode to a cursor mode in response to a movement input in accordance with an exemplary embodiment.

FIG. 8 illustrates a first device 430 switching from a text-entry mode 520 to a cursor control mode 490 in response to a side-to-side motion of the device 430. As discussed above, other actions can cause the first device 430 to switch modes, such as suitable inputs on a navigation tool 470 or actuation of a return or escape button 480. Other actions can cause the device 430 to switch modes, such as a vertical translational movement (not shown) or diagonal translational movement (not shown).

Figure 9:
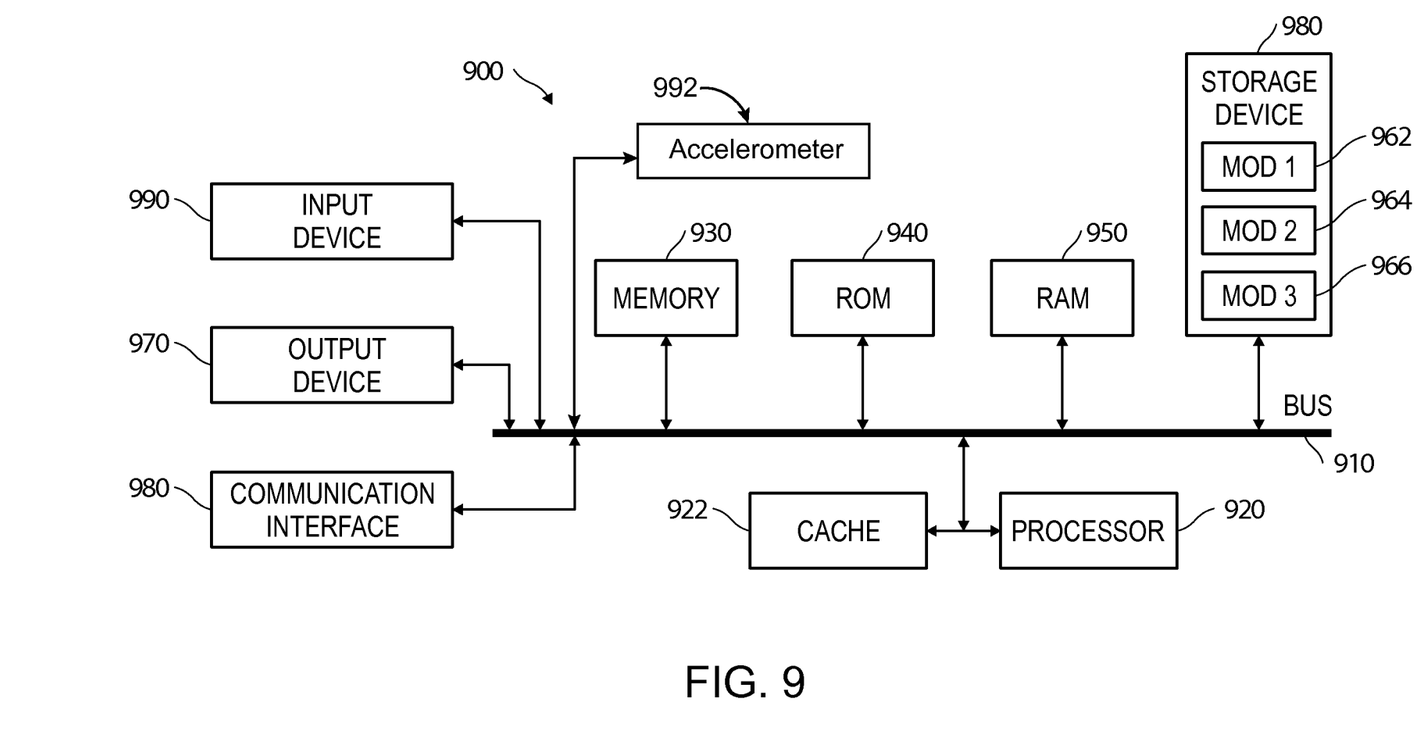
FIG. 9 illustrates a computing device system in accordance with an exemplary embodiment.

The disclosure now turns to a brief description of a computing device 900 (e.g. 400, 430), as shown in FIG. 9, which can be employed to practice the concepts is disclosed herein. The components disclosed herein can be incorporated in whole or in part into tablet computers, personal computers, handsets, transmitters, servers, and any other electronic or other computing device.

With reference to FIG. 9, an exemplary system 900 (e.g. 400, 430) includes a general-purpose computing device, including a processing unit (CPU or processor) 920 and a system bus 910 that couples various system components including the system memory 930 such as read only memory (ROM) 940 and random access memory (RAM) 950 to the processor 920. The system 900 can include a cache 922 of high speed memory connected directly with, in close proximity to, or integrated as part of the processor 920. The system 900 copies data from the memory 930 and/or the storage device 960 to the cache 922 for quick access by the processor 920. In this way, the cache provides a performance boost that avoids processor 920 delays while waiting for data. These and other modules can control or be configured to control the processor 920 to perform various actions. Other system memory 930 may be available for use as well. The memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general purpose processor and a hardware module or software module, such as module 1 962, module 2 964, and module 3 966 stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output system (BIOS) stored in ROM 940 or the like, may provide the basic routine that helps to transfer information between elements within the computing device 900 (e.g. 400, 430), such as during start-up. The computing device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer readable storage media provide nonvolatile storage of computer readable instructions, data structures, program modules and other data for the computing device 900. In one aspect, a hardware module that performs a particular function includes the software component stored in a non-transitory computer-readable medium in connection with the necessary hardware components, such as the processor 920, bus 910, display 470 (e.g. 402, 440), and so forth, to carry out the function. The basic components are known to those of skill in the art and appropriate variations are contemplated depending on the type of device, such as whether the device 900 is a small, handheld computing device, a desktop computer, or a computer server.

Although the exemplary embodiment described herein employs the hard disk 960, it should be appreciated by those skilled in the art that other types of computer readable media which can store data that are accessible by a computer, such as magnetic cassettes, flash memory cards, digital versatile disks, cartridges, random access memories (RAMs) 950, read only memory (ROM) 940, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 900, an input device 990 (e.g., 440, 460, 470, 480, 610) represents any number of input mechanisms, such as a microphone for speech, a touch-sensitive screen for gesture or graphical input, keyboard, mouse, motion input, speech and so forth. An input device can also include an accelerometer 992. An accelerometer can detect rotational and translational movements which can be received as input signals by the device 900. An output device 970 can also be one or more of a number of output mechanisms known to those of skill in the art. In some instances, multimodal systems enable a user to provide multiple types of input to communicate with the computing device 900. The communications interface 980 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 9 is presented as including individual functional blocks including functional blocks labeled as a "processor" or processor 920. The functions these blocks represent may be provided through the use of either shared or dedicated hardware, including, but not limited to, hardware capable of executing software and hardware, such as a processor 920, that is purpose-built to operate as an equivalent to software executing on a general purpose processor. For example the functions of one or more processors presented in FIG. 9 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 940 for storing software performing the operations discussed below, and random access memory (RAM) 950 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 900 shown in FIG. 9 can practice all or part of the recited methods, can be a part of the recited systems, and/or can operate according to instructions in the recited non-transitory computer-readable storage media. Such logical operations can be implemented as modules configured to control the processor 920 to perform particular functions according to the programming of the module. For example, FIG. 9 illustrates three modules Mod 1 962, Mod 2 964 and Mod 3 966 which are modules configured to control the processor 920. These modules may be stored on the storage device 960 and loaded into RAM 950 or memory 930 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon.

Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smartphone device but to other devices capable of receiving communications such as a laptop computer. Those skilled in the art will readily recognize various modifications and changes that may be made to the principles described herein without following the example embodiments and applications illustrated and described herein, and without departing from the scope of the disclosure.

We claim:

1. A method comprising:
   receiving at least one input on a first device in a cursor mode in which the input transmitted away from the first device is to be used to control a display of a second device, wherein the first device in the cursor mode acts as a cursor control mechanism for a cursor displayed on the display of the second device; and
   in response to the at least one touch input received, switching the first device from the cursor mode to a text entry mode, in which the first device acts as text-entry mechanism for the second device;
   wherein switching from the cursor to the text entry mode causes a display of the first device to display selectable characters.

2. The method of claim 1, wherein the at least one touch input corresponds to a sweeping gesture.

3. The method of claim 1, wherein the at least one touch input corresponds to a sequence of taps.

4. The method of claim 1, wherein the at least one touch input corresponds to a touch input on a particular portion of the first device.

5. The method of claim 1, wherein the at least one touch input corresponds to an actuation of an actuable input device.

6. The method of claim 5, wherein the actuable input device comprises an escape button.

7. The method of claim 5, wherein the actuable input device comprises a return button.

8. A system comprising:
   a processor;
   a non-transitory computer readable storage medium storing instructions for controlling the processor to perform steps comprising:
   receiving at least one touch input on a first device in a cursor mode in which the input transmitted away from the first device is to be used to control a display of a second device, wherein the first device in the cursor mode acts as a cursor control mechanism for a cursor displayed on the display of the second device; and
   in response to the at least one input received, switching the first device from the cursor mode to a text-entry mode, in which the first device acts as text-entry mechanism for the second device;
   wherein switching from the cursor to the text entry mode causes a display of the first device to display selectable characters.

9. The system of claim 8, wherein the at least one touch input corresponds to a sweeping gesture.

10. The system of claim 8, wherein the at least one touch input corresponds to a sequence of taps.

11. The system of claim 8, wherein the at least one touch input corresponds to a touch input on a particular portion of the first device.

12. The system of claim 8, wherein the at least one touch input corresponds to an actuation of an actuable input device.

13. The system of claim 12, wherein the actuable input device comprises an escape button.

14. The system of claim 12, wherein the actuable input device comprises a return button.

15. A method comprising:
   receiving at a computing device, an input from a second device indicative of a desire to input text;
   in response to the indicative input, transmitting, by the computing device, a signal to the second device to switch from a cursor control mode to a text entry mode;
   receiving at the computing device, a text selection input from the second device; and
   displaying by the computing device, text corresponding to the text selection input received from the second device, wherein switching from the cursor control mode to the text entry mode causes a display of the second device to display selectable characters.

16. The method of claim 15, further comprising:
receiving at the computing device, an indication that the second device has switched from a text entry mode to a cursor control mode,
in response to receiving the indication, displaying a cursor by the computing device.

17. The method of claim 16, further comprising:
receiving at the computing device, one or more cursor control signals from the first device.

18. The method of claim 15, wherein the input indicative corresponds to a movement input.

19. The method of claim 18, wherein the movement corresponds to a sideways translational movement.

20. The method of claim 18, wherein the movement corresponds to a tilt movement.

* * * * *